(12) United States Patent
Henkel

(10) Patent No.: US 7,216,182 B2
(45) Date of Patent: May 8, 2007

(54) SHARED STORAGE ARBITRATION

(75) Inventor: Thomas Henkel, Boblingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 443 days.

(21) Appl. No.: 10/825,473

(22) Filed: Apr. 15, 2004

(65) Prior Publication Data
US 2004/0243900 A1   Dec. 2, 2004

(30) Foreign Application Priority Data
May 30, 2003   (EP)   ................... 03101577

(51) Int. Cl.
G06F 13/00   (2006.01)
(52) U.S. Cl. .................... 710/5; 710/33; 710/305; 711/147
(58) Field of Classification Search ............... 710/5–6, 710/22–26, 33–35, 305–310; 711/147–154
See application file for complete search history.

(56) References Cited

U.S. PATENT DOCUMENTS

| 5,117,486 | A | * | 5/1992 | Clark et al. ................. 710/307 |
| 5,530,838 | A | * | 6/1996 | Hisano ....................... 711/151 |
| 5,544,346 | A | * | 8/1996 | Amini et al. ................ 711/154 |
| 5,630,096 | A | * | 5/1997 | Zuravleff et al. ........... 711/154 |
| 5,809,538 | A |   | 9/1998 | Pollmann et al. ........... 711/151 |
| 5,905,876 | A |   | 5/1999 | Pawlowski et al. ......... 395/292 |
| 5,950,229 | A | * | 9/1999 | Jeddeloh ..................... 711/150 |
| 6,088,772 | A |   | 7/2000 | Harriman et al. ........... 711/158 |
| 6,092,158 | A | * | 7/2000 | Harriman et al. ........... 711/151 |
| 6,442,628 | B1 | * | 8/2002 | Bastiani et al. .............. 710/60 |
| 6,622,272 | B1 | * | 9/2003 | Haverkamp et al. ........ 714/725 |
| 6,901,500 | B1 | * | 5/2005 | Hussain et al. ............. 711/213 |
| 2002/0046251 | A1 |   | 4/2002 | Siegel ........................ 709/213 |
| 2004/0250165 | A1 | * | 12/2004 | Tanizaki ..................... 714/30 |

* cited by examiner

Primary Examiner—Christopher Shin

(57) ABSTRACT

The invention provides an arbitration unit adapted for controlling accesses to a shared storage. The arbitration unit comprises a set of interfaces adapted for connecting a plurality of units with said arbitration unit, wherein outgoing data streams are transmitted from the arbitration unit via respective ones of said interfaces to at least one of said units, and wherein incoming data streams are transmitted from at least one of said units via respective ones of said interfaces to the arbitration unit. A control logic is connected to each of said interfaces, said control logic being adapted for segmenting write data of incoming data streams in order to set up write accesses to said shared storage, for scheduling a sequence of at least one of write and read accesses to said shared storage, and for distributing read data obtained during said read accesses to outgoing data streams.

17 Claims, 3 Drawing Sheets

SHARED STORAGE ARBITRATION

BACKGROUND OF THE INVENTION

The present invention relates to an arbitration unit, to a channel, and to a method for arbitrating accesses to a shared storage.

An electric or electronic system may comprise functional units that output data that has to be written to some kind of storage. There might exist different latency requirements with regard to the output data of the various functional units. Besides that, said functional units might generate different bandwidths of output data. Alternatively or additionally, said system might comprise functional units that have to be provided with input data that has to be read from some kind of storage. For some of these functional units, a low latency read access might be required. For other functional units, a high latency might be acceptable. Some functional units might require a high bandwidth of read data, while for others, a low bandwidth might be sufficient.

In order to meet the requirements imposed by the various functional units, one might provide the electric or electronic system with at least two different storages. This is not a very efficient solution, though.

SUMMARY OF THE INVENTION

It is an object of the invention to provide an improved arbitration for controlling accesses to a shared storage. The object is solved by the independent claims. Preferred embodiments are shown by the dependent claims.

The arbitration unit according to an embodiment of the present invention is adapted for controlling accesses to a shared storage. The arbitration unit comprises a set of interfaces that connect a plurality of units with said arbitration unit. Outgoing data streams are transmitted from the arbitration unit via respective ones of said interfaces to at least one of said units, and incoming data streams are transmitted from at least one of said units via respective ones of said interfaces to the arbitration unit. The arbitration unit further comprises a control logic that is connected to each of said interfaces. Said control logic is adapted for segmenting write data of incoming data streams in order to set up write accesses to said shared storage, for scheduling a sequence of at least one of write and read accesses to said shared storage, and for distributing read data obtained during said read accesses to outgoing data streams.

The arbitration unit might e.g. receive a stream of write data from one of said units. A block of write data that has been received via one of said interfaces is broken up into a plurality of smaller data packets, whereby the size of the data packets is such that they can be written to the shared storage during one single write access. Besides that, the arbitration unit might have to handle read requests that are issued by one or more of said units. In accordance with said read requests, the arbitration unit might perform read accesses to the shared storage. The arbitration unit schedules a sequence of at least one of write and read accesses to the shared storage, whereby "scheduling" shall mean to define the temporal order of said write and read accesses. The data that is obtained from the storage during the read accesses might be reassembled into data blocks. Said data blocks might be transmitted, via one of the interfaces, to a respective unit, in order to fulfil the read request of said unit.

The arbitration unit according to an embodiment of the present invention can be adapted in many ways to the properties of said units. The requirements imposed by said units can e.g. be considered by scheduling the memory accesses accordingly. The arbitration unit may choose the temporal order of the memory accesses in dependence on the required properties of the incoming or outgoing data streams, e.g. independence on the bandwidth or the latency required for a certain data stream. For example, a low latency read access might have to be scheduled immediately. For performing a high throughput write access, it might be necessary to perform a series of consecutive write accesses.

In order to allow for low latency memory accesses, each one of said read or write accesses must not take too long. The size of the data packets transferred during a single memory access is chosen in accordance with a trade off between latency and throughput.

According to a preferred embodiment of the invention, one or more of the interfaces comprise buffers that are adapted for buffering at least one of the incoming and outgoing data streams. Preferably, said buffers are realized as FIFO (First In First Out) buffers. For example, in a buffer that corresponds to a certain interface, write data that is received via said interface can be buffered. Even if the corresponding write access cannot be scheduled immediately, the write data can be accepted immediately. When a read request is processed, the read data that has been fetched from the memory might as well be buffered in a buffer, in order to provide a continuous data stream to the respective unit that has requested said data.

In another embodiment of the present invention, each of the interfaces is connected with a respective one of the functional units. Thus, each of the interfaces is assigned to a certain one of the functional units, and the respective properties of said functional unit can be taken into account. Incoming data streams that are received from a certain functional unit via said interface can be processed in accordance with the requirements imposed by said functional unit. Also outgoing data streams that are routed via said interface to a certain functional unit can be processed in accordance with the properties of said functional unit.

According to another preferred embodiment of the invention, one or more of the units transmit read requests to the arbitration unit, whereby at least some of said read requests indicate a start address and a size of a data block that is to be read from the shared storage. One or more of the functional units might as well transfer write requests to the arbitration unit before a corresponding stream of write data is sent from the respective functional unit to the arbitration unit, whereby at least one of said write requests might indicate the size of the block of write data and a start address. The arbitration unit converts each of the read or write requests into a number of corresponding read or write accesses. As soon as the arbitration unit has received a respective read request or write request, it can start scheduling the corresponding read accesses or write accesses. Said requests, which are received some time in advance, are helpful for generating an optimized sequence of read and write accesses.

According to another preferred embodiment of the invention, said read and write accesses to the shared memory are scheduled in accordance with priorities that are assigned to at least some of the arbitration unit's interfaces, or to at least some of the incoming and outgoing data streams. The temporal order of the read and write accesses is determined by the control logic of the arbitration unit. If a high priority is assigned to an incoming data stream, the write accesses corresponding to said incoming data stream will be processed more quickly than other read and write accesses. In case of a very high priority, the write accesses corresponding to said incoming data stream might even be scheduled immediately. If a high-priority read request is received, the corresponding read accesses will be carried out favorably, while low-priority write and read accesses will be postponed. As soon as the high-priority accesses have been processed, the low-priority accesses will be taken care of.

Preferably, whenever an incoming or outgoing data stream has to be processed with low latency, a correspondingly high priority is assigned to said data stream. By assigning a high priority, it can be achieved that the corresponding read or write accesses are scheduled more quickly than other read and write accesses. As a result, a low-latency storage access can be provided. Thus, the arbitration unit's control logic allows to fulfill different kinds of latency requirements imposed by the functional units.

According to another preferred embodiment, the priorities are modified in a way that the amount of switching between read accesses and write accesses is kept small. Each time said switching is performed, an extra delay will occur. In order to avoid said extra delays, it is preferable to first process a group of write accesses, followed by a group of read accesses, etc. When a read access is being processed, it will be most favorable if the following memory access is a read access as well. This can e.g. be achieved by incrementing the priorities of the read requests, while the priorities of the write requests are kept constant. In contrary, when a write access is being performed, it is most favorable to process a write request next. In this case, one might e.g. increase the priorities assigned to the write requests, while the priorities of the read requests are kept constant.

According to another embodiment, the priorities assigned to the read requests and to the write requests are modified in a way that a continuous transmission of data is promoted. If several memory accesses that relate to adjacent address ranges have to be processed, said memory accesses should preferably be carried out in succession in order to avoid any time delays due to re-addressing. Therefore, when a memory access that relates to a certain address range is processed, the priorities assigned to memory accesses that relate to adjacent address ranges are increased, and as a consequence, said memory accesses will most probably be scheduled next. As a consequence, an uninterrupted transmission of data is enhanced, and the amount of extra time delays due to re-addressing is kept small.

According to another preferred embodiment, the priority that is assigned to a certain interface is modified in dependence on the fill level of the buffer that corresponds to said interface. The higher the fill level of said buffer gets, the higher the priority of the corresponding data stream will become. By increasing the priority of the buffered data stream in dependence on the fill level, it can be achieved that memory accesses corresponding to said data stream are scheduled in a preferred manner. As a consequence, the fill level of the respective buffer decreases, and overflow can be avoided.

In a preferred embodiment of the invention, the arbitration unit is employed in a channel of an automated test equipment (ATE). The channel is responsible for at least one of: providing stimulus data to at least one device under test (DUT), and receiving response data from said at least one DUT. The channel's arbitration unit is responsible for coordinating the memory accesses to a shared storage. Said shared storage might e.g. be adapted for storing at least one of instructions and sequencer data. Said instructions and said sequencer data might be used for generating a stream of test data. The shared memory might as well be utilized for storing result data that is obtained by evaluating response data obtained from the at least one DUT.

In prior art solutions, a channel of an automated test equipment encompassed at least two different memories, a low-latency SRAM adapted for providing a stream of instructions to a sequencer unit, and a high-latency DRAM adapted for storing sequencer data as well as result data. The use of two different memories with completely different properties allowed to fulfill the latency and bandwidth requirement of the channel's functional units.

According to embodiment of the present invention, said at least two distinct memories are replaced by one shared memory that is controlled by an arbitration unit. The shared memory might e.g. be used for storing at least one of instructions, vector data, and result data. Thus, the set-up of the channel is simplified. A channel according to an embodiment of the present invention is cheaper and smaller than a channel according to the prior art.

Preferably, the units of said channel comprise at least one of: a sequencer, a result processing unit, an interface module, and a microprocessor core. The sequencer unit reads instructions and sequencer data from the shared memory and generates a stream of output data that might e.g. be provided to at least one of the drive path and the receive path of the channel. The result processing unit is responsible for evaluating the response data obtained from said at least one DUT. The result processing unit might generate a stream of result data that is written to the shared memory. The interface module is adapted for establishing a data link between the channel and a central facility. Via said interface module, data might be exchanged between the channel's shared memory and said central facility. Besides that, the channel might comprise a microprocessor core.

According to a preferred embodiment, outgoing data streams are transmitted from the arbitration unit to the sequencer, whereby said outgoing data streams might comprise at least one of instructions and sequencer data. Preferably, a high priority is assigned to an outgoing data stream that comprises instructions for said sequencer. Thus, it is made sure that the instruction stream is not disrupted.

According to another preferred embodiment, the arbitration unit is adapted for receiving an incoming data stream from the result processing unit, whereby said incoming data stream might comprise result data. Said result data might e.g. be generated by comparing response data obtained from said at least one DUT with expected data.

According to another embodiment of the invention, the arbitration unit exchanges data streams of high priority with said interface module. Especially if there do not exist any handshake signals, data that is exchanged between the interface module and the arbitration unit will have to be taken care of immediately.

Preferably, the shared storage is implemented as a dynamic RAM. A dynamic RAM (DRAM) is cheaper and smaller than a SRAM. Preferably, a RDRAM comprising a synchronous clocked interface is employed. Due to said clocked interface, a data exchange of high bandwidth can be realized.

Further preferably, the arbitration unit comprises a memory maintenance unit, whereby said memory maintenance unit forwards maintenance requests to the shared storage. In case a DRAM is used, said maintenance requests might for example comprise requests for performing a memory refresh.

The invention can be partly or entirely embodied or supported by one or more suitable software programs, which can be stored on or otherwise provided by any kind of data carrier, and which might be executed in or by any suitable data processing unit. Software programs or routines are preferably applied for scheduling the sequence of write and read accesses to the shared storage.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF EMBODIMENTS OF THE INVENTION

Figure 1:
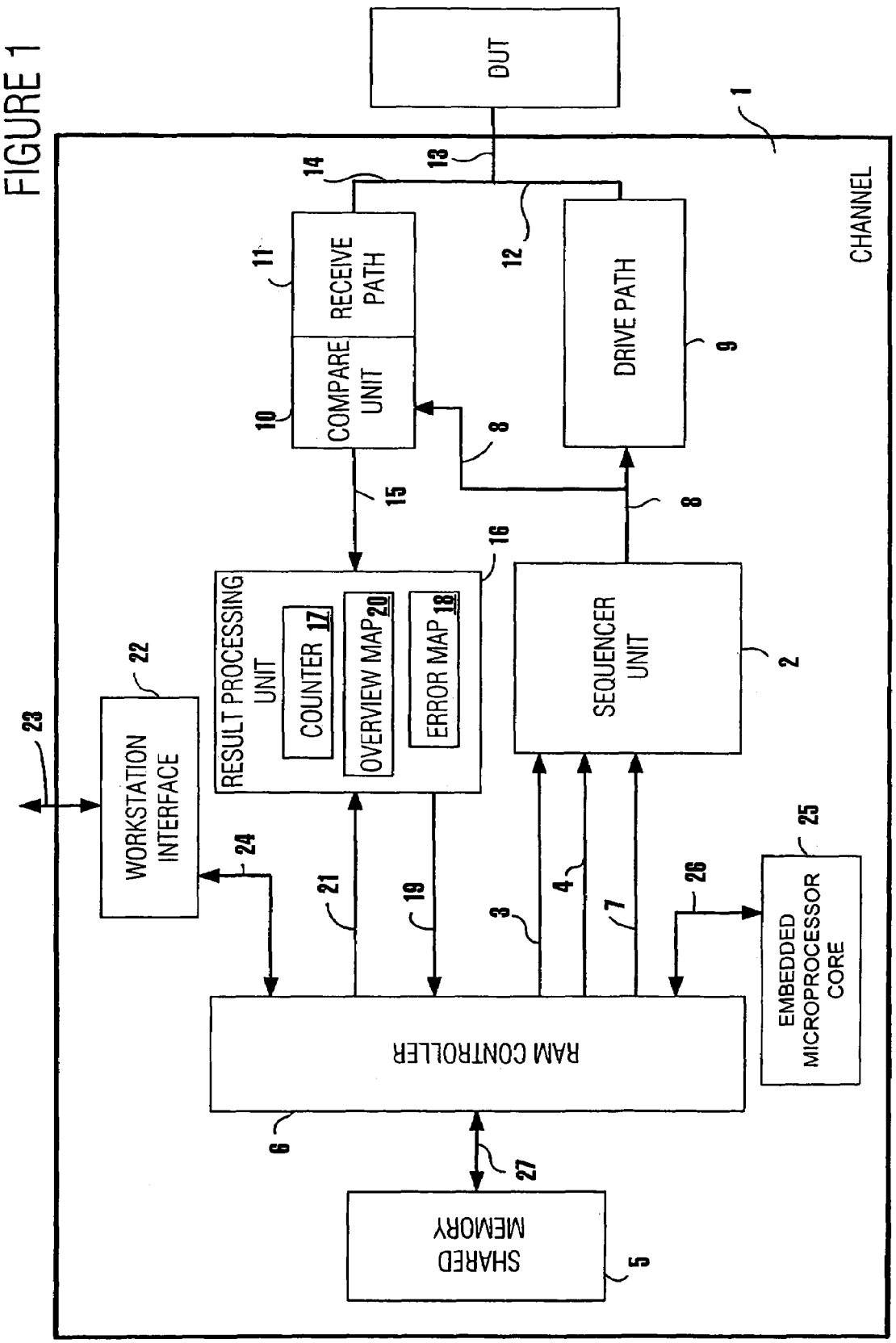
FIG. 1 shows a channel of an automated test equipment (ATE)

In FIG. 1, a channel 1 of an automated test equipment (ATE) is shown, whereby the channel 1 is responsible for at least one of: providing stimulus data to a DUT, and analyzing response data obtained from said DUT. The channel 1 doesn't have to be a channel of an automated test equipment; it might as well be a channel within any kind of multi-channel architecture. The channel 1 comprises a sequencer unit 2 that receives sequencer instructions 3 and sequencer data 4 from a shared memory 5 that is preferably implemented as a RDRAM. According to embodiments of the present invention, the shared memory 5 is accessed via an arbitration unit 6. If the DUT comprises at least one DRAM memory, the sequencer unit 2 might also read refresh data 7 from the shared memory 5. Said refresh data 7 is responsible for periodically initiating a refresh of the at least one DRAM memory within the DUT.

In accordance with the sequencer instructions 3, the sequencer unit 2 generates an output data stream 8 that might comprise both drive data and expected data. The output data stream 8 is provided both to the drive path 9 and to the compare unit 10 of the receive path 11. The drive path 9 comprises a waveform table, which is a look-up table adapted for converting the vectors of the output data stream 8 into a corresponding sequence of waveforms. Each waveform comprises a set of edges, together with timing information for said edges. At the output of the drive path 9, a stream of stimulus data 12 is obtained, and said stream of stimulus data 12 is provided to the pin 13 of the DUT.

Alternatively or additionally, a stream of response data 14 might be obtained from the pin 13 of the DUT. In the compare unit 10, the response data 14 is compared with expected data that is transmitted as a part of the output data stream 8. For this reason, the output data stream 8 is also provided to the compare unit 10 of the receive path 11. The compare unit 10 generates a stream of result data 15 comprising the results of the comparison. Said stream of result data 15 is provided to the result processing unit 16. The result processing unit 16 comprises a counter 17 that keeps track of the error count. Furthermore, the result processing unit 16 generates an error map 18 by recording the results as a function of the respective cycle. The error map data 19 is written, via the arbitration unit 6, to the shared memory 5. Besides that, the result processing unit 16 generates an overview map 20, with one bit of said overview map representing 4 kByte of result data 15.

When a DUT is tested, different kinds of errors might occur simultaneously. If only a subset of said errors is to be tracked and analyzed, it will be required to mask out all the other errors. For this purpose, cycle mask data 21 that is read from the shared memory 5 is provided to the result processing unit 16. Said cycle mask data 21 defines those parts of the result data stream 15 that have to be masked out.

As described so far, the shared memory 5 contains sequencer instructions, sequencer data and cycle mask data. Besides that, the shared memory 5 contains result data that is received from the result processing unit 16. For exchanging the shared memory's content with a workstation, the channel 1 comprises a workstation interface 22 adapted for establishing a data link 23 with the workstation. Via the workstation interface 22, data 24 can be exchanged between the workstation and the shared memory 5. Said data 24 is routed via the arbitration unit 6. Furthermore, the channel 1 comprises an embedded microprocessor core 25. Between said microprocessor core 25 and the shared memory 5, data 26 might be exchanged as well, whereby said data is also routed via the arbitration unit 6.

According to embodiments of the present invention, the arbitration unit 6 segments write data of incoming data streams into corresponding data packets in order to set up write accesses to the shared memory 5. Said incoming data streams might comprise streams of result data 19, of data 24 exchanged with the workstation interface 22, and of data 26 exchanged with the embedded microprocessor core 25. The arbitration unit 6 schedules a sequence of write and read accesses to the shared memory 5. Read data obtained during the read accesses is distributed to the outgoing data streams. Said outgoing data streams might comprise the sequencer instructions 3, the sequencer data 4, the refresh data 7, and the cycle mask data 21. The outgoing data streams might also comprise data 24 for the workstation interface 22, and data 26 for the embedded microprocessor core 25.

Figure 2:
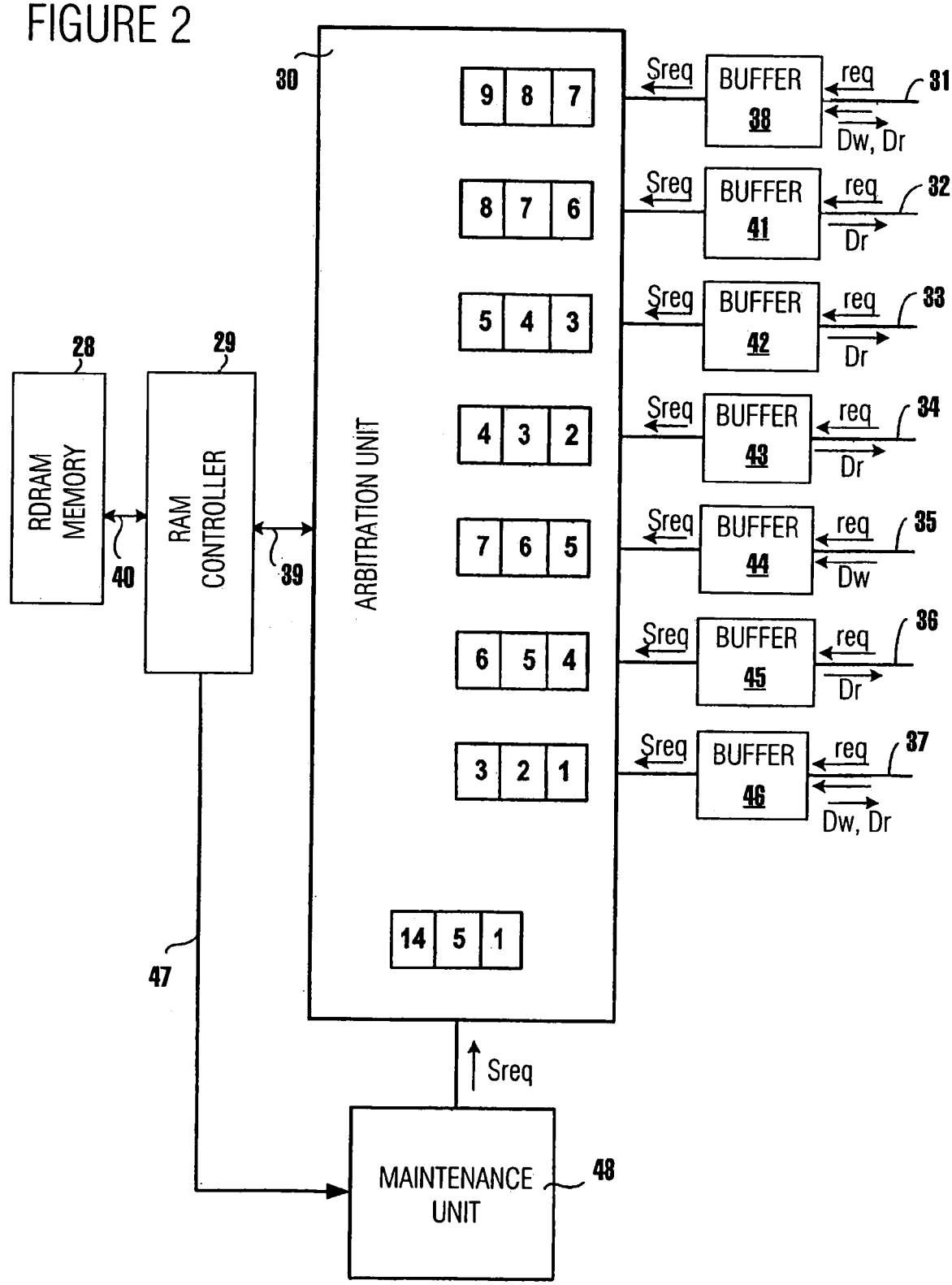
FIG. 2 shows a memory unit comprising a shared storage and an arbitration unit.

In FIG. 2, the channel's memory unit is depicted. The memory unit comprises a RDRAM memory 28, a RAM controller 29, and an arbitration unit 30. The arbitration unit 30 comprises a set of interfaces 31–37 for the various incoming and outgoing data streams. Via a first interface 31, data is exchanged with the workstation interface 22 shown in FIG. 1. The workstation may write to and read from the shared memory, and therefore, the corresponding request req may be a write request or a read request. A write request is adapted for indicating the start address of the write access and the size of the data block that is to be written to the shared memory. Correspondingly, in a read request, the start address and the size of a data block that is to be read from the shared memory are specified.

In case of a write access, write data Dw is buffered in a FIFO (First In First Out) buffer 38. The FIFO buffer 38 issues so-called slice requests req to the arbitration unit 30. There, priorities are assigned to the slice requests of the various interfaces, and the slice requests are handled in accordance with their respective priorities.

In the example shown in FIG. 2, priorities ranging from "1" to "9" are assigned to the various slice requests. The priority assigned to a data stream that is transmitted via one of the interfaces is modified in dependence on the corresponding FIFO buffer's fill level. For example, in case the FIFO buffer 38 is empty, a priority of "7" is assigned to a slice request req that corresponds to the first interface 31. When the fill level of the FIFO buffer 38 increases, it becomes more urgent to handle the corresponding data stream. Accordingly, the priority assigned to the slice request req of the first interface 31 is increased from "7" to "8" or "9" in dependence on the fill level of the FIFO buffer 38.

The workstation interface 22 might as well transmit a read request to the FIFO buffer 38. One or more slice requests req corresponding to said read request are forwarded to the arbitration unit 30 and there, priorities ranging from "7" to "9" are assigned to said slice requests.

The arbitration unit 30 receives slice requests req from all the interfaces that are connected to said arbitration unit 30. The arbitration unit 30 schedules a sequence of write and read data slices, whereby each of said data slices is of fixed size. For example, each of said data slices might comprise 256 bits of data. The write data Dw of a data block received via the interface 31 is broken up into a number of data slices, with each data slice comprising 256 bit of write data. Said data slices are scheduled in accordance with their respective priority. Then, said data slices are transmitted, as a part of a slice train 39, from the arbitration unit 30 to the RAM controller 29. The slice train 39 also comprises data slices that have been read from the shared memory, and each of said data slices also comprises 256 bit of read data. The RAM controller 29 exchanges read and write-data 40 with the RDRAM memory 28.

As an example, let us assume that the workstation interface 22 has issued a read request to the first interface 31. Slice requests that correspond to said read request are transmitted to the arbitration unit 30. The data slices are scheduled by the arbitration unit 30, and the corresponding read accesses are performed by the RAM controller 29. Within the slice train 39, the obtained data slices of read data are transmitted from the RAM controller 29 to the arbitration unit 30. There, data slices corresponding to various outgoing data streams are received and distributed to the FIFO buffers of the corresponding interfaces. The data slices that relate to the read request issued by the workstation interface 22 are written in sequential order to the FIFO buffer 38. The FIFO buffer 38 comprises a buffer for buffering incoming data as well as a buffer for buffering outgoing data. The workstation interface 22 can fetch the requested data block of read data Dr from the FIFO buffer 38.

Via the second interface 32, sequencer instructions are provided to the sequencer unit 2 shown in FIG. 1. The requested sequencer instructions are read from the RDRAM memory 28 and are transmitted within the slice train 39 to the arbitration unit 30. The arbitration unit 30 writes said sequencer instructions to the FIFO buffer 41.

The third interface 33 is responsible for providing sequencer data to the sequencer unit 2. Sequencer data that has been read from the shared memory is buffered in a corresponding FIFO buffer 42.

The fourth interface 34 is adapted for providing refresh data to the sequencer unit 2. Refresh data that has been read from the shared memory is buffered in the FIFO buffer 43.

The error map 18, which is part of the result processing unit 16 shown in FIG. 1, provides a stream of result data to the fifth interface 35 of the arbitration unit 30. The result data is buffered in a FIFO buffer 44.

The stream of cycle mask data is an outgoing data stream that is provided to the result processing unit 16 of FIG. 1. The cycle mask data that has been read from the RDRAM memory 28 is buffered in the FIFO buffer 45. Via the sixth interface 36, the cycle mask data is forwarded to the result processing unit 16.

The seventh interface 37 is adapted for exchanging data with the embedded microprocessor core 25 of FIG. 1. The corresponding FIFO buffer 46 comprises a buffer for buffering incoming data as well as a buffer for buffering outgoing data.

In FIG. 2, the respective priorities that are assigned to the incoming and outgoing data streams of the various interfaces are depicted. The three priorities that are shown for each one of the interfaces 31–37 correspond to different fill levels of the respective FIFO buffers 38, 41–46. The highest priority is assigned to data that is exchanged, via the interface 31, with the workstation. Data that is provided by the workstation has to be processed immediately, because there do not exist any handshaking signals between the arbitration unit, the workstation interface and the workstation.

From FIG. 2, it can be seen that a priority ranging from "6" to "8" is assigned to the stream of sequencer instructions that is read from the shared memory. Thus, it can be achieved that the stream of sequencer instructions is not disrupted. Priorities ranging from "5" to "7" are assigned to the stream of result data received via the interface 35. Due to this rather high priority, the stream of result data received from the error map 18 can be continuously written to the RDRAM memory 28. To the data streams that are exchanged with the channel's microprocessor core 25, a low priority ranging from "1" to "3" is assigned. As a consequence, the latency of the microprocessor core's memory accesses will be rather high.

Maintenance requests 47 that relate to the maintenance of the RDRAM memory 28 are generated by the RAM controller 29. Said maintenance requests 47 might for example comprise requests for performing a refresh of the RDRAM memory 28. The maintenance requests 47 are forwarded to the maintenance unit 48. In order to schedule said maintenance requests, slice requests are transmitted from the maintenance unit 48 to the arbitration unit 30. Initially, the priority "1" is assigned to a maintenance request. After some time, it is checked whether the maintenance request has been processed or not. If the maintenance request has not been processed yet, the priority of said maintenance request is increased to "5". After some more time has elapsed, it is checked once more whether the maintenance request has been taken care of. If the maintenance request still hasn't been processed, the priority is even set to "14" in order to enforce that the respective maintenance request is scheduled. Thus, it can been made sure that a periodic refresh of the RDRAM memory 28 is performed.

Figure 3:
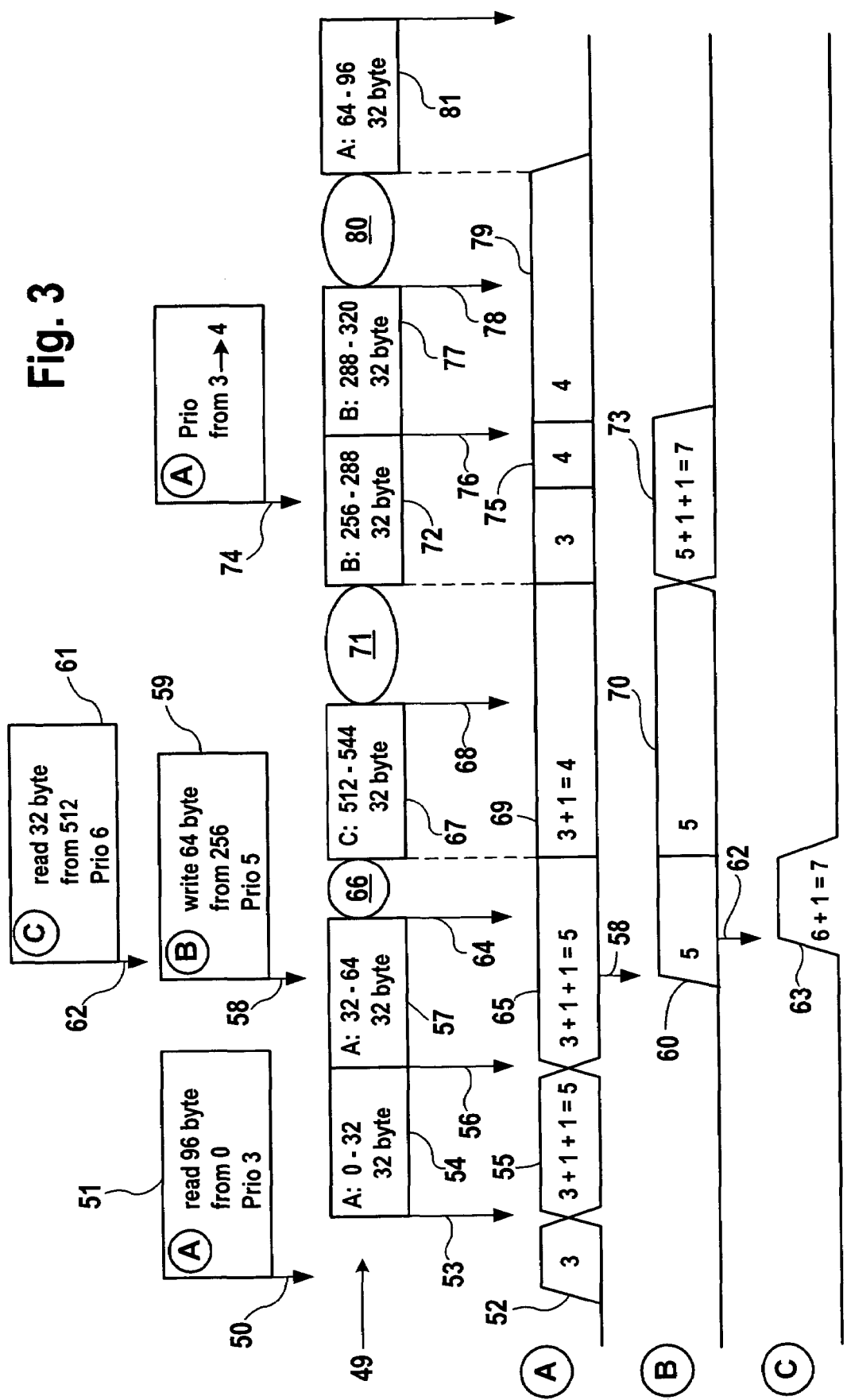
FIG. 3 shows the structure of a slice train comprising slices of read data and write data.

FIG. 3 shows how a plurality of read and write requests are converted into a slice train 49, whereby the time that has elapsed is indicated from the left to the right. At the point of time 50, a first read request 51 is received via an interface A, whereby said read request specifies both the start address ("0") and the size ("96 byte") of the data block that has to be read from the memory. The first read request 51 might for example be a read request for reading sequencer data from the memory, and therefore, the priority "3" might be assigned to said first read request 51.

An interface slice request 52 from interface A is set in order to indicate to the arbitration unit's control logic that a request with priority "3" from interface A has to be processed. In FIG. 3, the interface slice requests from interfaces A, B, and C are shown underneath the slice train 49. At the point of time 53, the next data slice of the slice train 49 has to be selected. There exists only one interface slice request 52 at said point of time 53, and therefore, in accordance with the interface slice request 52, 32 byte are read from the addresses 0 to 32 of the RDRAM memory 28. The obtained data is transmitted, as a data slice 54, from the memory to the arbitration unit.

The first read request 51 relates to a data block of 96 bytes. After the transmission of the data slice 54, there remain 64 byte that still have to be processed. For this reason, an interface slice request 55 from interface A remains active. The priority of the interface slice request 55 is increased from 3 to 3+1+1=5.

The first reason why the priority of the interface slice request 55 is increased is that whenever a data slice comprising read data is transmitted, all the priorities of interface slice requests that correspond to read accesses are increased, while the priorities of interface slice requests that correspond to write accesses are kept constant. Whenever a data slice comprising write data is transmitted, the priorities of interface slice requests that correspond to write accesses are increased, while the priorities of interface slice requests that correspond to read accesses remain constant. By doing this, it can be achieved that the amount of switching between write accesses and read accesses is reduced. Any switching between write accesses and read accesses gives rise to an extra time delay that will further on be referred to as a "read-to-write bubble" or a "write-to-read bubble". By reducing the amount of switching between write accesses and read accesses, said extra time delays are reduced, and the RDRAM memory can be accessed more efficiently.

The second reason why the priority of the interface slice request 55 is increased is that after a certain data slice has been transmitted, the priority of data slices that relate to an adjacent address range is increased in order to promote continuous read and write operations. After the data slice 54 has been read from the shared memory, it is favorable to read an adjacent data slice from said shared memory, because in this case, no re-addressing is necessary. In order to promote continuous read and write operations, the priorities of subsequent data slices might e.g. be incremented by one. By doing this, extra time delays due to re-addressing, which will further on be referred to as "re-addressing bubbles", are reduced.

In accordance with these two reasons, the priority of the interface slice request 55 is incremented from "3" to "4" in order to avoid any switching between read and write operations, and said priority is further increased from "4" to "5" in order to promote the transmission of an adjacent block of data.

At the point of time 56, only the interface slice request from interface A is active. Accordingly, 32 byte of read data that are read from the addresses 32 to 64 are transmitted, as a data slice 57, from the memory to the arbitration unit.

At the point of time 58, a write request 59 is received by the arbitration unit 30 via an interface B. The write request 59 indicates that 64 byte of write data starting at the address 256 have to be written to the memory. Said write data might e.g. be a block of result data, and correspondingly, a priority of "5" might be assigned to said write data. At the point of time 58, the interface slice request 60 from interface B is set.

A second read request 61 is received at the point of time 62, and said second read request 61 indicates that 32 byte of read data have to be read from the memory starting at the address 512. The read request 61, which is received via the interface C, might for example relate to fetching instructions from the memory, and therefore, a priority of "6" might initially be assigned to said read request. At the point of time 63 when the second read request 61 is received, a read access is being processed. In order to avoid any switching from read to write, the priority of the second read request 61 is incremented from "6" to "7". At the point of time 62 when the second read request 61 is received, the interface slice request 63 from interface C is set.

The transmission of the data slice 57 is finished at the point of time 64. At said point of time 64, the interface slice request 65 from interface A is still active, because the first read request 51 hasn't been completed yet. A third data slice corresponding to the first read request 51 still has to be transmitted. At the point of time 64, the priority "7" of the interface slice request 63 is higher than the respective priorities of the interface slice requests 60 and 65. Accordingly, a data slice 67 that corresponds to the second read request 61 is scheduled next.

After a time delay 66 that is caused by re-addressing, the data slice 67 is transmitted, said data slice 67 comprising 32 bytes of read data from the addresses 512 to 544. By transmitting the data slice 67, the read request 61 is completed, and accordingly, the interface slice request 63 from interface C is reset to zero.

At the point of time 68, two interface slice requests from the interfaces A and B are active. The priority of the interface slice request 69 has been changed from "5" to "4", because now, re-addressing would be necessary for processing said slice request. At the point of time 68, the interface slice request 70 has the highest priority, and accordingly, the write request 59 is processed next. After a time delay 71 caused by a "read-to-write bubble", a data slice 72 comprising 32 byte of write data is transmitted. Said write data, which is received via the interface B, is written to the memory addresses 256 to 288. In order to promote a continuous transmission of write data from the arbitration unit to the shared memory, the priority of the interface slice request 73 is changed from "5" to "7".

At the point of time 74 during the transmission of the data slice 72, the fill level of the FIFO buffer corresponding to interface A might exceed a certain predefined fill level, and correspondingly, the priority of the interface slice request 75 is increased from "3" to "4".

At the point of time 76, it is decided to transmit another data slice 77 of write data corresponding to the write request 59. Said write data, which is received via the interface B, is written to the memory addresses 288 to 320 of the shared memory. By transmitting the data slice 77, the write request 59 is completed, and accordingly, the interface slice request 73 is reset to zero.

At the point of time 78, only the interface slice request 79 from interface A is active. because the first read request 51 hasn't been completed yet. After a time delay 80 caused by a "write-to-read bubble", a third data slice 81 corresponding to the first read request 51 is transmitted from the shared memory to the arbitration unit. Said data slice 81 comprises 32 byte of read data that have been read from the memory addresses 64 to 96.

The invention claimed is:

1. A channel for use in an automated test equipment, said channel comprising:
   a storage unit with an arbitration unit adapted for controlling accesses to a shared storage, said arbitration unit comprising:
      a set of interfaces adapted for connecting a plurality of units with said arbitration unit, wherein outgoing data streams are transmitted from the arbitration unit via respective ones of said interfaces to at least one of said units, and wherein incoming data streams are transmitted from at least one of said units via respective ones of said interfaces to the arbitration unit, and a control logic that is connected to each of said interfaces, said control unit being adapted for segmenting write data of incoming data streams in order to set up write accesses to said shared storage, for scheduling a sequence of at least one of write and read accesses to said shared storage, and for distributing read data obtained during said read accesses to outgoing data streams;

a sequencer adapted for reading data from said storage unit, and for providing stimulus data to at least one DUT; and a result-processing unit adapted for evaluating result data obtained from said at least one DUT, and for writing data to said storage unit.

2. The channel of claim 1, further comprising an interface module adapted for establishing a data link between the channel and a central facility.

3. An automated test equipment adapted for testing at least one DUT, said automated test equipment comprising:
   at least one channel according to claim 1, and
   a central facility adapted for coordinating said at least one channel.

4. The channel of claim 1, wherein at least one of said interfaces comprises at least one buffer, preferably at least one FIFO buffer, that is adapted for buffering one or more of the incoming and outgoing data streams.

5. The channel of claim 1, wherein each of said interfaces is connected to a respective one of said units.

6. The channel of claim 1, wherein at least one of said units is adapted for transmitting at least one of write requests or read requests to the storage unit, wherein at least one write request indicates a start address and a size of the data block that is to be written to said shared storage, and wherein at least one read request indicates a start address and a size of the data block that is to be read from said shared storage.

7. The channel of claim 1, wherein said control logic is adapted for scheduling said read accesses and said write accesses based on priorities that are assigned to at least some of the various interfaces, or to at least some of the various incoming and outgoing data streams.

8. The channel of claim 7, wherein said control logic is adapted for modifying said priorities in a way that the amount of switching from write to read, or vice versa, is kept small.

9. The channel of claim 7, wherein said control logic is adapted for modifying said priorities in a way that a continuous transmission of at least one of said data streams is promoted.

10. The channel of claim 7, wherein said control logic is adapted for modifying said priorities in a way that the higher the fill level of a buffer gets, the higher the priority of the corresponding buffered data stream will become.

11. The channel of claim 1, wherein said control logic is adapted for assigning a high priority to an outgoing data stream that comprises instructions for said sequencer.

12. The channel of claim 1, wherein said storage unit is adapted for receiving an incoming data stream from said result processing unit, said incoming data stream comprising result data that is to be written to said shared storage.

13. The channel of claim 1, wherein said storage unit is adapted for exchanging data streams with said interface module, wherein a high priority is assigned to said data streams.

14. The channel of claim 1, wherein said shared storage is a Random Access Memory.

15. The channel of claim 1, wherein said control logic is adapted for considering a low latency of an incoming or outgoing data stream by assigning a correspondingly high priority to the respective data stream.

16. The channel of claim 14, wherein said Random Access Memory is a Dynamic Random Access Memory.

17. The channel t of claim 1, further comprising a memory maintenance unit adapted for providing maintenance requests to said shared storage.

* * * * *